(12) United States Patent
Kim

(10) Patent No.: US 7,104,251 B2
(45) Date of Patent: Sep. 12, 2006

(54) FLUID SWIRLING DEVICE HAVING ROTATABLE VANES

(76) Inventor: Jay S. Kim, 9728 Alburtis Ave., Santa Fe Springs, CA (US) 90670

( * ) Notice: Subject to any disclaimer, the term of this patent is extended or adjusted under 35 U.S.C. 154(b) by 0 days.

(21) Appl. No.: 11/129,085

(22) Filed: May 16, 2005

(65) Prior Publication Data

US 2006/0162690 A1    Jul. 27, 2006

Related U.S. Application Data

(63) Continuation-in-part of application No. 11/042,101, filed on Jan. 26, 2005.

(51) Int. Cl.
F02B 31/04 (2006.01)
F02M 29/00 (2006.01)
F01N 7/00 (2006.01)

(52) U.S. Cl. .................. 123/306; 123/592; 60/324
(58) Field of Classification Search ............... 123/306, 123/590, 592, 593; 60/309, 324; 422/176
See application file for complete search history.

(56) References Cited

U.S. PATENT DOCUMENTS

| | | | | |
|---|---|---|---|---|
| 942,503 A * | 12/1909 | Jacobs | ................ | 123/592 |
| 1,051,369 A * | 1/1913 | Heath | ................ | 123/592 |
| 1,261,230 A * | 4/1918 | Haynes | ................ | 48/189.5 |
| 1,312,660 A * | 8/1919 | Winslow | ................ | 123/590 |
| 1,345,791 A * | 7/1920 | Livingstone | ................ | 48/189.4 |
| 1,740,613 A * | 12/1929 | Lyle | ................ | 48/189.5 |
| 2,127,628 A * | 8/1938 | Hauser | ................ | 48/189.5 |
| 3,895,930 A * | 7/1975 | Campolong | ................ | 55/394 |
| 3,964,875 A * | 6/1976 | Chang et al. | ................ | 422/176 |
| 4,422,432 A * | 12/1983 | Knox, Sr. | ................ | 123/592 |
| 4,463,742 A | 8/1984 | Williams | | |
| 4,478,607 A * | 10/1984 | Capps | ................ | 48/189 |
| 4,537,173 A * | 8/1985 | Norris | ................ | 123/592 |
| 5,113,838 A | 5/1992 | Kim | | |
| 5,568,800 A * | 10/1996 | Einaudi et al. | ................ | 123/546 |
| 5,638,797 A * | 6/1997 | Kim | ................ | 123/592 |
| 5,916,134 A * | 6/1999 | Yang et al. | ................ | 60/299 |
| 5,947,081 A | 9/1999 | Kim | | |
| 6,041,753 A * | 3/2000 | Lin et al. | ................ | 123/306 |
| 6,055,913 A * | 5/2000 | Gerber et al. | ................ | 110/104 B |
| 6,158,412 A * | 12/2000 | Kim | ................ | 123/306 |
| 6,209,528 B1 * | 4/2001 | Kondo | ................ | 123/565 |
| 6,796,296 B1 | 9/2004 | Kim | | |
| 6,805,092 B1 * | 10/2004 | Chang | ................ | 123/306 |
| 6,928,979 B1 * | 8/2005 | Chen | ................ | 123/306 |

FOREIGN PATENT DOCUMENTS

NL        1015888        12/2002

\* cited by examiner

Primary Examiner—Hai Huynh
(74) Attorney, Agent, or Firm—Chris Papageorge

(57) ABSTRACT

The device includes a set of rotatable vanes and a set of stationary vanes which are mounted within a cylindrical housing. The set of rotatable vanes are connected to a post located at the axis of the housing and rotate relative to the post in response to the intake or exhaust fluid impinging on the vanes which are angled relative to the direction of flow of the fluid stream. The set of stationary vanes are rigidly secured to the post and also rigidly secured to the housing walls. The set of stationary vanes are positioned adjacent the set of rotatable vanes and are similarly angled relative to the direction of flow of the fluid stream in order to deflect the fluid stream and impart a swirling motion to the fluid stream in order to provide more complete mixing of the air/fuel mixture of the intake fluid stream or scavenging of the exhaust fluid stream. Tabs which extend radially outwardly from the housing ends secure the device within an intake or exhaust passageway.

47 Claims, 6 Drawing Sheets

FLUID SWIRLING DEVICE HAVING ROTATABLE VANES

CROSS-REFERENCE TO RELATED APPLICATION

This application is a continuation in part of patent application Ser. No. 11/042,101 filed Jan. 26, 2005 entitled Fluid Swirling Device and now copending.

BACKGROUND OF THE INVENTION

The invention relates generally to fuel economizers and performance enhancers for internal combustion engines of the type conventionally used in motor vehicles. More specifically, the invention relates to devices which improve the fuel economy and performance of such internal combustion engines via modification of the intake and exhaust systems thereof. The invention also more specifically relates to intake and exhaust system components, parts and fittings which provide enhanced combustion efficiency by more thoroughly mixing the air and fuel entering the engine or by improving exhaust gas flow through the exhaust system.

With the continually increasing worldwide proliferation of motor vehicles, worldwide concern for the reduction of toxic gases emitted from the internal combustion engines of such vehicles has concomitantly increased. As a result, manufacturers of motor vehicles have sought to directly treat the toxic exhaust gases by means of exhaust gas recirculation or catalytic degradation. Such efforts have been generally successful in reducing the toxic gases emitted from the internal combustion engines. However, such additional treatment is expensive, is not long lasting so that it requires component replacement at certain intervals and requires maintenance. In addition, such modifications of motor vehicle exhaust systems increases the weight of the vehicles and may compromise performance.

Some motor vehicle manufacturers have therefore sought to reduce toxic exhaust gas emissions by modification of the intake systems of the internal combustion engines thereof. However, intake systems of internal combustion engines have particular complexities which make addressing these concerns via modification of the intake systems very difficult.

In a conventional internal combustion engine's intake system, the fluid flow which moves adjacent the walls of the intake passageway i.e., laminar fluid flow, typically includes a substantial amount of gasoline that is not atomized. Fuel that is not atomized does not readily combust. Thus, incomplete atomization of the fuel in the fluid flow hinders complete combustion of the fluid. This laminar flow consequently reduces the combustion efficiency of the engine. In addition, due to the frictional forces generated by contact of the fluid flow against the walls of the intake passageway, the laminar fluid flow travels through the passageway at a slower velocity than the rest of the fluid flow. Moreover, due to the difference in mass density between the gasoline molecules and the air molecules in the laminar fluid flow, the gasoline molecules experience greater frictional forces via contact with the walls of the passageway than the air molecules resulting in slower moving gasoline molecules than air molecules. This difference in velocity tends to additionally hamper mixing of the gasoline particles with the air particles thereby further contributing to incomplete combustion of the fluid and reducing the efficiency of the engine in converting heat energy to mechanical energy.

Inducing turbulence in the fluid flow passing through the intake passageway reduces laminar fluid flow and moves the slower moving gasoline particles away from the walls of the passageway thereby preventing further deceleration caused by contact with the walls. Both of these effects result in improved mixing of the air and fuel. Such benefits can be realized if turbulence is induced either in the air entering the carburetor (or fuel injection system), in the fluid passing through the intake manifold or intake runners or in the fluid passing through the intake ports or around the intake valves of the engine. Consequently, various devices and systems have been designed to induce such turbulence at various locations in the intake system.

Some prior art devices which are designed to produce turbulence in the air entering the fuel introduction subsystem include vanes which deflect the air passing thereagainst in order to impart a swirling motion to the air. Some such devices include a hub or central member to which the device vanes are attached. The central member provides rigidity to the vanes so that they do not absorb energy of deflection but rather transmit that energy back to the fluid. The central member is typically streamlined in order to reduce obstruction of fluid flow and reduce negative pressure areas which would otherwise create undesired turbulence.

Others of such prior art devices which induce turbulence through the use of vanes do not utilize a central member in order to eliminate the likelihood that such members would present a significant obstruction to air flow. Some of these devices utilize vanes which are radially curved to attach both ends of the vanes to the same side of the cylindrical housing. However, the vane portions which are at the central area produce higher stresses at the attachment points due to the effects of leverage. In addition, the absence of a secure central connection and thereby lack of rigidity of the vanes at the central area results in deflection movement in response to the forces of the fluid flow. The movement of the vanes may adversely affect the fluid flow movement by setting up harmonics in the fluid, by absorbing energy from the fluid flow or by undesired deflection of the fluid flow. The vanes are often made thicker in an attempt to obviate these shortcomings. However, the thicker vanes reduce the cross-sectional area of the passageway thereby tending to reduce fluid flow through the passageway.

Many of the prior art devices that induce air turbulence are manufactured in various sizes to accommodate the differently sized and structured intake systems of the many makes and models of motor vehicles on the market. Some of these prior art devices are simply dimensioned to adequately fit in the duct in which placed while others are designed to be diametrically resilient to exert a force against the inner walls of the intake duct and thereby provide a more snug fit therein. This prevents displacement of the device within the duct and also allows it to accommodate small variations in the diametrical sizes of these ducts. However, due to the oftentimes high vibrations acting on the device while in use and during vehicle operation, this snug fit is often not enough to prevent displacement of the device. Displacement of the device from its intended position can result in damage to the device, the duct or other parts of the intake system or engine. As a result of these problems many of these devices are instead designed to fit in other parts of the intake system in which component structures thereof are available to secure the device therein.

One of the primary disadvantages of prior art devices or systems that generate intake air turbulence is that the structures thereof that produce the desired turbulence also restrict air flow through the system. This undesirably reduces the maximum quantity of air and fuel that is delivered into the engine thereby reducing its maximum horsepower output. The deflection of air flowing through the intake system so as to produce turbulence may absorb excessive kinetic energy of the moving air thereby undesirably reducing the velocity of the air flow into the engine. In addressing these concerns, some designers have minimized the total surface area of the turbulence generating structures. Although such designs have been somewhat successful in reducing the otherwise excessive kinetic energy reduction of the air flow, they also reduce the amount of desired turbulence generated. Other designers have addressed these concerns by orienting the turbulence generating structures at relatively small angles relative to the incoming air flow. Such designs have successfully reduced the otherwise excessive kinetic energy reduction of the air flow, but they have similarly also reduced the amount of desired turbulence generated.

Some prior art devices seek to improve mixing of the air and fuel by inducing both turbulence and a swirling motion to the fluid stream. An example of a prior art device that generates swirling and also turbulence of the intake air is disclosed in U.S. Pat. No. 5,947,081 to Kim. The device disclosed includes vanes which have slits as well as concave and convex portions. The small concave and convex surface portions of the vanes deflect small portions of the air flow at relatively sharp angles of deflection. The high degree of deflection produces turbulence of the air stream. This turbulence includes collision of fluid flow molecules rather than a smooth blending or mixing of the fluid flow. Consequently, the collisions absorb energy thereby reducing the velocity of the fluid flow and consequently reducing fluid flow. In addition, the slit portions reduce the amount of metal in certain portions of the vanes thereby producing weakened portions which may break off under operational stress resulting in malfunction or damage to proximal engine components.

Another important disadvantage of some prior art devices is that they are difficult or expensive to mount in the engine system. Some prior art devices such as that disclosed in U.S. Pat. No. 4,424,777 to Klomp require that they be installed around the intake valves necessitating that the purchaser disassemble the engine and have engine components suitably machined to adapt these components to the device. But, this is typically a time consuming and expensive endeavor rendering such devices impractical for many motor vehicle owners. Similarly, other prior art devices require that they be installed in the intake manifold or runner necessitating that the purchaser disassemble major components of the engine in order to install such devices. But, this is also a time consuming and expensive endeavor requiring a degree of mechanical skill rendering such devices impractical for many motor vehicle owners.

Designers of such prior art intake fluid turbulence generation systems have recognized that the effectiveness of such turbulence varies according to the engine throttle position. U.S. Pat. No. 4,424,598 to Tsutsumi discloses an automobile swirl producing system which is responsive to engine load and engine operating conditions. Basically, the Tsutsumi system uses a pivot shaft responsive to carburetor throttle valve position to alter the swirl produced in the combustion chamber. However, the disadvantage of such a system is that it is difficult to properly install, and this especially discourages many do-it-yourselfers from purchasing it.

Designers of exhaust systems have also recognized that improving the rate of exhaust gas flow out of the engine can provide improved combustion efficiency. There have consequently been many exhaust systems that have sought to increase the velocity of exhaust gas flow out of the exhaust system and thereby in effect scavenge exhaust gases from the combustion chamber and exhaust ports. Some exhaust header systems have been designed to position exhaust pipes around the inner circumference of a collector pipe to produce swirling of the exhaust gases from the collector pipe in a vortex flow and thereby enhance exhaust gas flow therefrom. Such systems have been very effective in improving exhaust as well as intake fluid flow and thereby improving combustion. However, such systems require retuning of the carburetor or fuel injection system and ignition system of the engine as well as replacement of major engine system components and are thus impractical for many motor vehicle owners. In addition, such systems typically do not meet government emission standards requirements and are thus undesirable for the typical vehicle owner.

The many requirements for such air swirling or air turbulence generating devices and systems have resulted in prior art systems and devices in which there are compromises between swirl or turbulence generation and air flow restriction. In addition, there have also been many prior art systems that have been very effective in generating the required swirl or turbulence yet have necessitated undue engine component alterations and labor consumption. Consequently, what is needed is an intake and exhaust fluid swirling device which does not require special tools for installation and thus may be easily manually installed. What is also needed is an intake and exhaust fluid swirling device providing enhanced swirl generation while producing minimal fluid flow restriction. What is additionally needed is such a device which may be securely positioned in passageways of intake and exhaust systems.

SUMMARY OF THE INVENTION

It is a principal object of the present invention to provide an air swirling device that can be positioned in an intake passageway for air entering the fuel introduction subsystem of an internal combustion engine.

It is also another object of the present invention to provide an exhaust swirling device that can be positioned in an exhaust passageway for exhaust exiting an internal combustion engine.

It is another object of the present invention to provide an intake and exhaust fluid swirling device having structural components that are angled and shaped to provide enhanced swirling of the fluid flow.

It is another object of the present invention to provide an intake and exhaust fluid swirling devicing having vanes for inducing fluid swirling which spin in response to the forces of the intake and exhaust fluid stream acting thereon.

It is an object of the present invention to provide an intake and exhaust fluid swirling device which provides minimal obstruction to the fluid stream.

It is also an object of the present invention to provide an intake and exhaust fluid swirling device which produces fluid flow swirl the degree of which is proportional to the kinetic energy of the fluid stream entering the device.

It is an object of the present invention to provide an intake and exhaust fluid swirling device the degree of swirl produced varying according to engine operation parameters in order to normalize the degree of swirl produced.

It is also an object of the present invention to provide an intake and exhaust fluid swirling device which absorbs a portion of the fluid stream kinetic energy, the degree of that absorption inversely proportional to the kinetic energy of the fluid stream entering the device.

It is also an object of the present invention to provide a fluid swirling device having structural components which provide secure retention of the device within intake and exhaust passageways.

It is an object of the present invention to provide a fluid swirling device having structural components which are resilient to provide a snug fit in an intake or exhaust passageway.

It is an object of the present invention to provide a fluid swirling device that does not require disassembly of major engine components for installation thereof.

It is an object of the present invention to provide a fluid swirling device that may be manually installed in an intake or exhaust passageway.

It is an object of the present invention to provide an exhaust gas swirling device that reduces back pressure.

Essentially, the device of the present invention is designed to be positioned in the fluid flow path of an internal combustion engine and deflect the flow passing therethrough so as to induce a rotational or swirling type of movement of the fluid. This swirling movement tends to move the fluid away from the walls of the passageway and reduce continual or prolonged contact with the walls of the passageway which produce frictional forces exerting a drag on the fluid flow. When positioned in an intake passageway, the swirling motion enhances mixing of the air and fuel yielding more complete combustion of the fuel mixture. When positioned in a tailpipe or exhaust pipe, the swirling motion reduces the decrease in exhaust gas velocity that would otherwise occur yielding reduced backpressure and thereby increasing engine power output.

The device achieves its goal of modifying the straight motion of the intake air or exhaust gas flow so as to produce swirling motion of that flow by incorporating vanes which are positioned in the fluid flow stream. The vanes are angled so that they deflect the fluid laterally into a rotational movement. This lateral motion in combination with the longitudinal motion of the fluid stream ultimately results in a swirling or vortex type of motion of the fluid stream.

The device addresses a crucial disadvantage of prior art devices which is that they present deflection structures set at the same angle of deflection at both high and low engine speeds thereby resulting in a compromise of efficiency at both extremes of engine (and motor vehicle speed). In contrast, the free spinning characteristic of the present invention precludes a high degree of deflection at low engine speeds when the fluid stream velocity may not be high enough or the kinetic energy may not be high enough to accept a high degree of deflection as with prior art angled vanes without compromising optimum engine intake efficiency. Such a relatively high degree of deflection at low engine speeds would unduly reduce the velocity of the intake fluid entering the engine thereby reducing the mass or volume of intake fluids entering the combustion chamber. As a result, such prior art angled vanes may unduly reduce the power output and performance of the engine. Similarly, such a high degree of deflection of prior art angled vanes at low engine speeds would unduly reduce the velocity of the exhaust fluid exiting the engine thereby increasing backpressure to such an extent that the intake fluid is reduced. But, the alternative of providing a vane oriented at a small angle specifically for low engine speeds may render the vanes less efficient at high engine speeds when the air flow has high kinetic energy so that only minimal deflection results from striking the vanes. In contrast, the free spinning characteristic of the present invention allows the rotating vanes to be provided with a greater degree of angulature than conventional swirlers having stationary vane designs. At high air stream velocities, the relatively high kinetic energy of the air stream simply increases the degree of rotational motion of the vanes. At low air stream velocities, the relatively low kinetic energy of the fluid stream causes the vanes to rotate slowly and a proportionately greater amount of the kinetic energy may thereby be utilized to deflect the fluid stream. At high fluid stream velocities the relatively high kinetic energy of the stream causes the vanes to rotate faster yet present relatively low resistance to movement of the fluid stream through the device. The rotating characteristic of the vanes renders the vanes responsive to the high velocity of the fluid stream and its higher kinetic energy and may be able to surrender relatively larger amounts of this energy in order to produce the desired deflection and the desired swirl. Thus, the present invention via its unique free spinning feature provides deflection and kinetic energy absorption that is tailored to engine operational characteristics. This yields more efficient swirl generation. The vanes' ability to spin allows them to be at a higher and more optimal angulature than would otherwise be possible because less kinetic energy is absorbed at all engine speeds and throughout the engine's parameters of operation in accordance with their ability to respond to the air flow velocity and kinetic energy.

When the kinetic energy is high due to either high engine speeds or high mass of fluid stream entering the device, the rotatable vanes spin at a relative high rate. But, reducing the engine speed, closing the throttle or reducing engine load does not result in immediate reduction of the rotational speed of the rotatable vanes. Thus, the kinetic energy of the vanes which is still high is transmitted to the fluid stream which was moving with less kinetic energy than before the transmittal. This has a normalizing effect on the fluid stream kinetic energy.

It is an important feature that the rotatable vane structure is positioned upstream of the stationary vanes. In this way the swirl motion is gradually introduced to the fluid stream thereby minimizing undesired turbulence and agitation. The stationary vanes thus meet a fluid stream which has already experienced a directional change in motion and is thus swirling to a certain degree. Due to inertia, this facilitates further generation of swirl of the stream by the stationary vanes. Consequently, more fluid stream swirl is generated than may be possible with prior art designs in which angled stationary vanes meet head on and deflect a fluid stream which is moving in a straight line longitudinally through the passageway. In contrast to less efficient prior art designs, the present invention produces swirl of the fluid stream with minimal reduction of the fluid stream's kinetic energy and with minimal reduction of the fluid stream's velocity. Furthermore, conventional prior art designs unduly absorb the fluid stream's kinetic energy and reduce the velocity of the fluid stream. Consequently, the device of the invention does not have the deleterious effect on intake and exhaust system efficiency of conventional prior art systems and devices.

In operation, the spinning vanes rotate into contact with the back side of the mass of fluid that is moving through the device of the invention. The rotating vanes will in effect push on the mass of fluid. Since the air and fuel combination is a fluid mixture, the fluid mass has a certain degree of cohesiveness and this will cause that portion of the fluid stream to in effect bend into the desired lateral direction which adds to the swirl motion. That portion of the fluid stream is thus made to change direction. Thus, the rotating vanes cause the deflection or change to a lateral direction by means of deflection by impinging on the vanes head on as well as by means of the vanes striking the fluid on the tail side. With regard to each particular mass of fluid stream in the form of a fluid sheet moving between the particular pairs of rotating vanes, that sheet is induced to change to lateral direction of motion at both sides of the fluid stream sheet. This produces a smoother transition from longitudinal direction of movement to lateral direction of movement. As a result, the swirl that is produced is smoother and with less undesired turbulence than without such rotating vane structure.

In operation, the rush of fluid stream impinging on the rotating vanes will deflect i.e., change its direction of movement or in effect push the vanes into moving laterally. The degree to which the fluid stream will either change its direction of movement or move the vanes laterally depends on which takes less kinetic energy from the fluid stream. Consequently, the degree of rotational motion of the vanes is proportional to the velocity of the fluid stream and the mass density of the fluid stream passing through the rotating vane structure. These factors depend upon engine speed, throttle position and engine load. Thus, the rotational speed of the rotating vane structure as well as the fluid stream's change in direction to lateral movement will vary in degree. Therefore, the rotating vane structure has a normalizing effect on the degree of swirl produced during typical engine operation. In contrast, with conventional stationary vanes, the angle of deflection is constant throughout the engine speed range, throttle and engine load. Consequently, with conventional stationary vanes, the deflection angle although perhaps sometimes optimum is other times less than optimum during typical engine operation.

The device includes a housing within which the vanes are mounted. The housing is open at both longitudinal ends for the fluid flow to pass through. The housing is sized and shaped to accommodate the intake ducts or passageways of various motor vehicles as well as the exhaust pipes or passageways of various motor vehicles. This makes it relatively easy for a user to simply manually insert the device into an intake duct or exhaust pipe. However, due to engine vibrations and vehicle jarring type motions, other prior art devices have become dislodged from their desired locations in such ducts. Therefore, in order to overcome such shortcomings of prior art devices, the present invention includes structures which engage the passageway in such ways as to enable it to be retained in its desired position therein. These structures include tabs at the lower end of the housing which project outwardly therefrom. The tabs are integral with the housing and resist inward deflection. Thus, when the housing is inserted in a duct (which is diametrically slightly larger than the housing), the resilient tabs engage the duct and exert a resistive force thereagainst. The resistive force prevents undesired movement of the device relative to the duct thus ensuring a tight fit or snug fit. In addition to the effect of the resistive force, the ends of the tabs which contact the inner surfaces of the duct are relatively small thereby providing a gripping surface. The gripping surface also prevents undesired movement of the device relative to the duct.

The retaining structures of the invention also include tabs at the upper end of the housing which similarly project outwardly therefrom. These tabs have outer ends which extend radially from the housing. The underside straight surfaces of the tabs engage the rim of the duct in which the housing is positioned and thereby act to block axial movement of the housing relative to the duct. Thus, the tab ends prevent the housing from undesirably moving deeper into the duct. Moreover, intake systems typically include a component structure that fits over the rim and enabling it to be used to cover the tab ends thus block axial movement of the housing relative to the duct. The blocking effect of that component structure prevents the housing from undesirably moving out of the duct. Thus, when the device is installed in the duct and the intake system is assembled, the tabs prevent movement of the housing relative to the duct in both axial directions. The upper and lower tabs thus enable the device to stay in its desired position within the passageway without the need for screws or other fastener means to anchor it in place. Obviating the need for fasteners results in no need to drill holes in the intake system or otherwise cause structural changes thereto which may weaken it or produce air leaks. Moreover, this feature of the present invention facilitates proper user installation thereof making the installation process fast, simple and easy.

The vanes are mounted within the housing and extend radially between the inner walls thereof and the central post (or axle). The vanes have appendages at the longitudinal ends thereof, and the housing has apertures which receive the appendages. The appendages extend through the apertures, and their ends are positioned flat against the outer surface of the housing and secured thereto in order to attach the vanes at the outer ends thereof to the housing.

The apertures are angled so that the vane portions located at the housing are comparably angled. The angulature of the vanes produces a rotational movement of the fluid flow upon impacting these vane portions. The end portions of vanes located at opposite sides of the housing are angled in opposite directions from each other.

The lower apertures are also angled relative to the upper apertures. The lower apertures are angled in the same axial direction but to a greater degree than the upper apertures. This results in the vane being angled upwardly more at its trailing edge than at its leading edge. The upper and lower portions of the vane at their peripheral portions thus have different angles of inclination so that the fluid stream is deflected first at the upper portion and subsequently deflected again in the same direction at the lower portion to produce a higher degree of deflection. Providing the vane portions with axially increasing angular orientation results in a smoother deflection of the fluid flow. This takes less kinetic energy from the impacting fluid flow than would otherwise result. Consequently, there is minimal reduction in fluid flow velocity. However, the upper and lower portions of the vanes at their central portions (at the central post or axle) do not have different angles of inclination. Instead, the upper and lower portions of the vane at their central portion have the same degree of inclination. The vanes are secured to the central post of axis so that the medial portions of the vanes are at the same angle of inclination as the peripheral portions. Each vane in its entirety is thus angled at a particular angle of inclination.

In comparison to conventional prior art designs, the rotatable vanes present less obstruction to the fluid flow because they yield to the kinetic energy of the fluid flow passing therethrough. Moreover, after passing through the spinning vanes, the fluid stream is further deflected by the stationary vanes to increase the degree of desired swirl thereby enhancing the swirl producing effectiveness of the device of the present invention.

DETAILED DESCRIPTION OF THE PREFERRED EMBODIMENT

Figure 1:
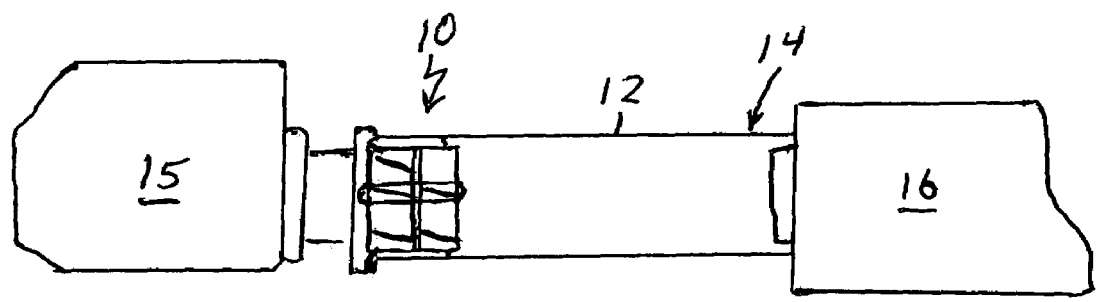
FIG. 1 is a sectional view of an intake air flow subsystem which incorporates the device of the present invention and showing the carburetor and intake duct of the subsystem.

Referring to the drawings, the swirling device of the present invention is generally designated by the numeral 10. The device 10 is sized to fit inside an intake passageway or duct 12 of an intake subsystem 14 of an internal combustion engine (not shown). The passageway 12 leads to a fuel introduction subsystem 16 which may be a fuel injection subsystem, as shown, or a carburetor. The passageway is thus used for delivery of intake air to the fuel injection subsystem 16 from the air filter box 15.

Figure 2A:
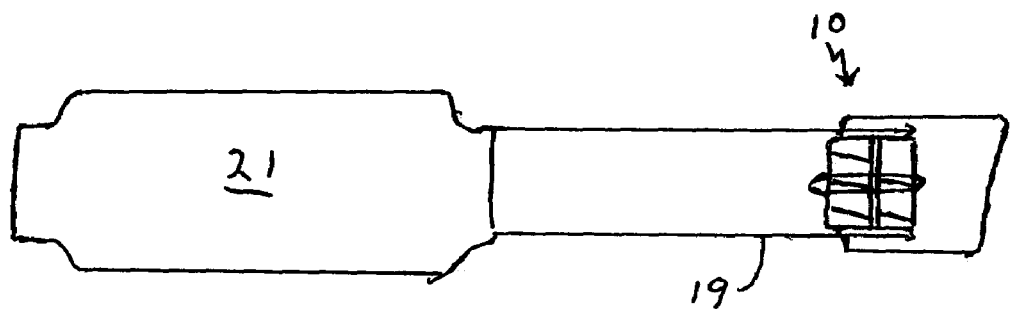
FIG. 2A is a sectional view of an exhaust gas flow subsystem which incorporates the device of the present invention and showing the catalytic converter and tailpipe of the subsystem.

FIG. 2A shows the device 10 mounted in an exhaust passageway or pipe 19. The tailpipe 19 is attached to a catalytic converter 21 which receives the exhaust gases from the muffler (not shown) and from the engine (not shown). The device provides a swirl to the exhaust gases resulting in a vortex shaped flow stream thereby drawing out the exhaust gases from the exhaust system.

Figure 2B:
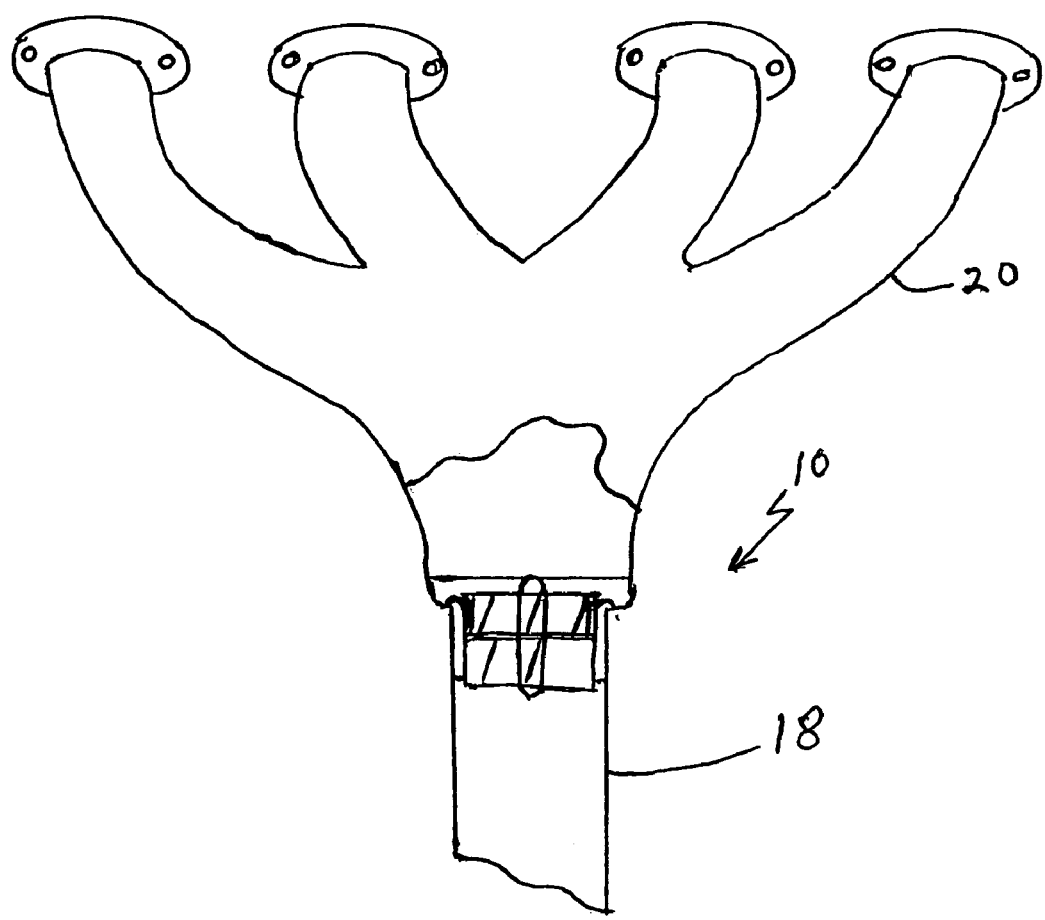
FIG. 2B is a sectional view of an exhaust gas flow subsystem which incorporates the device of the present invention and showing the exhaust manifold and exhaust pipe of the subsystem.
Figure 3:
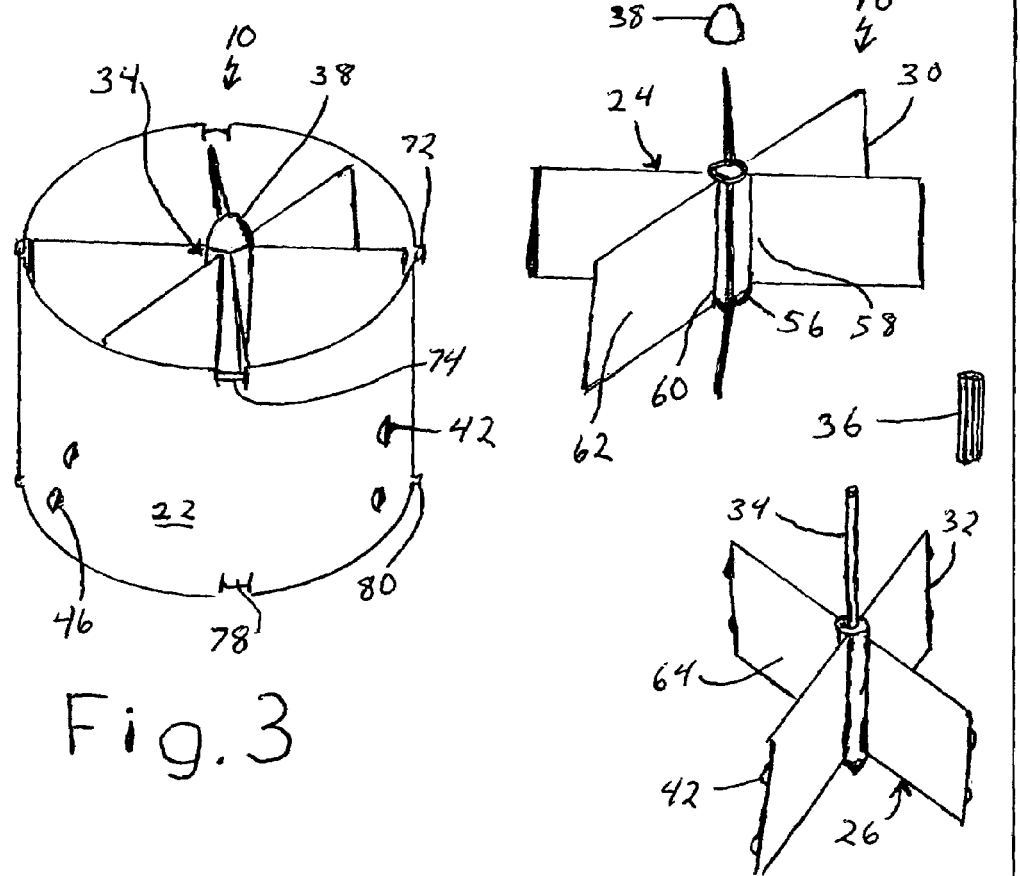
FIG. 3 is a perspective view of the device of the present invention.
Figure 4:
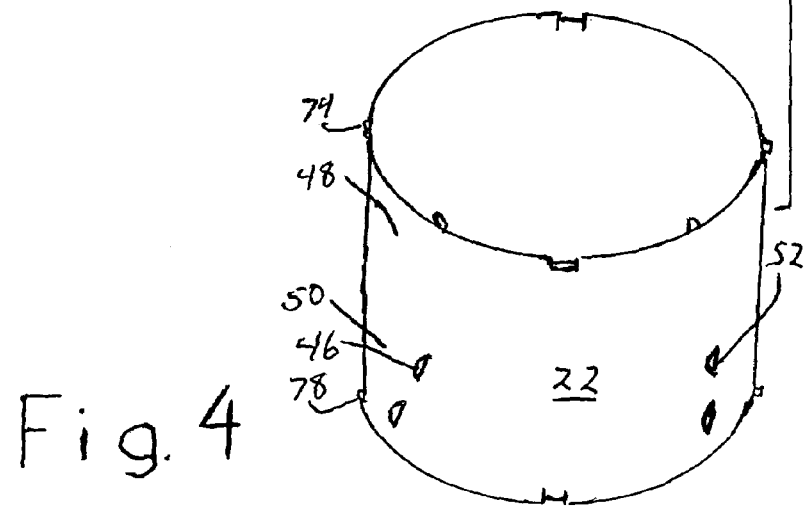
FIG. 4 is an exploded view of the device of the present invention.
Figure 5:
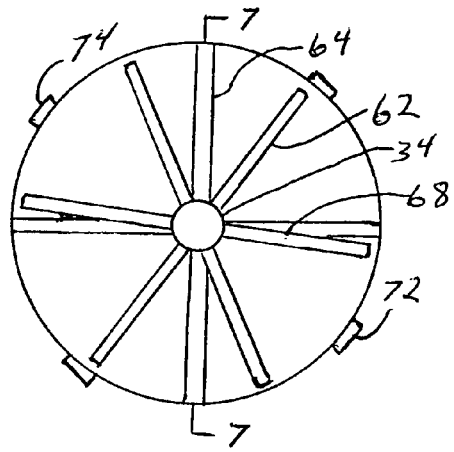
FIG. 5 is a top view of the device of the present invention.
Figure 6:
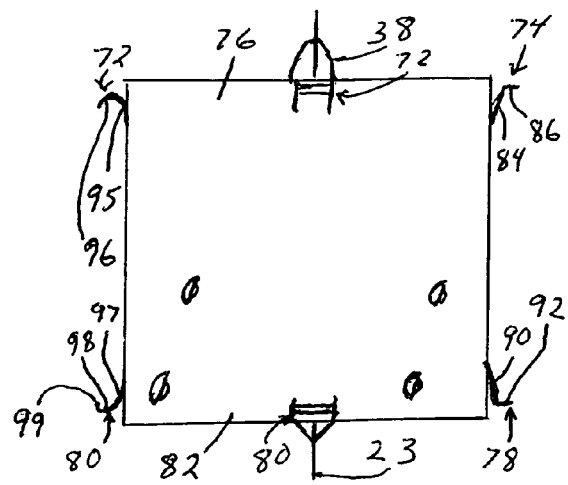
FIG. 6 is a side view of the device of the present invention showing the apertures thereof.
Figure 7:
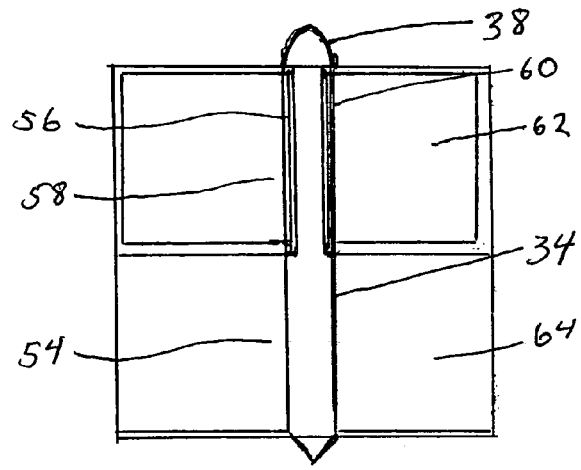
FIG. 7 is a longitudinal-sectional view of the device of the present invention taken along lines 7—7 of FIG. 6.

FIG. 2B shows the device 10 mounted in another type of exhaust passageway or pipe 18. The exhaust pipe 18 is attached to an exhaust manifold 20 which receives the exhaust gases from the exhaust port (not shown) and combustion chamber (not shown) of the engine.

The device 10 is preferably manufactured in different sizes to accommodate the differently sized intake ducts and passageways of various makes and models of motor vehicles. The device includes a housing 22 which is preferably cylindrical in shape (having an axis 23) to accommodate standard intake ducts which are similarly cylindrical in shape. However, other types of housing shapes may also be used to accommodate intake ducts or exhaust ducts having other shapes. The housing 22 is open at both ends yet circumferentially closed and dimensioned so that it may be fitted within the ducts 12, 18 and 99 and positioned in the path of the intake gases and exhaust gases therein to allow these gases to pass therethrough.

The device 10 preferably includes an upper member 24 and a lower member 26. Both the upper member and the lower member are mounted within the housing 22 and positioned adjacent each other. The upper member is positioned so that it is upstream of the fluid stream 28 so that it initially meets the gas flow of the fluid stream 28.

The upper member 24 includes a set of vanes 30. The set of vanes 30 are movably mounted onto an axle 34 so that the set of vanes are able to rotate relative to the axle 34. The set of vanes 30 are mounted on the axle 34 via a bearing 36 in order to reduce the frictional forces generated by movement of the set of vanes 30. Alternatively, a bushing (not shown) may be used instead of the bearing 36 in order to provide longevity and durability. Since the tip 38 of the axle 34 faces the fluid stream 28, it is curved to reduce aerodynamic resistance. Preferably, the tip 38 is more curved at its front end portion than more rearward portions such that it is parabolic in longitudinal section.

The lower member 26 is dissimilar from the upper member 24 in that the lower member has a set of vanes which are stationary relative to the axle or central post 34. Thus, the set of vanes 32 are securely connected to the central post 34 at their inner lateral ends 40 by welding for example. Alternatively, the set of vanes 32 may be instead integral, with the central post 34. In addition, the set of vanes 32 are securely connected to the housing 22. Thus, the set of vanes 32 securely interconnect the housing 22 and central post 34. This interconnection provides a degree of structural strength and rigidity to the entire device 10. The preferred means of interconnection of the set of vanes 32 to the housing 22 is via a set of upper and lower appendages 42 at the outer lateral ends 44 of the set of vanes 32 which are received by a set of upper and lower apertures 46 in the upper wall portions 48 and lower wall portions 50 respectively of the housing 22.

The apertures 46 are preferably located at diametrically opposite sides of the housing 22. The apertures 46 may be semi-circular (as shown) or rectangular and dimensioned to provide a snug fit between the apertures 46 and the appendages 42. The apertures 46 are partly defined by aperture wall portions 52 which are preferably straight to engage the corresponding appendages 42 which are similarly straight (or flat). The apertures 46 and, more specifically, the wall portions 48 and 50 are angled such that they are inclined relative to the axis 23. The angle of inclination of the apertures 46 and the upper wall portions 48 are preferably six degrees with reference to the axis 23. The angle of inclination of the apertures 46 and the lower wall portions 50 are preferably also six degrees with reference to the axis 23. Since the apertures 46 and appendages 42 and their corresponding vanes 32 snugly interfit, the angle of inclination of the apertures 46 translates to the same angle of inclination of the vanes 32 at portions adjacent to the apertures 46. Away from the apertures 46 (and the housing 22) at the medial portions 54 of the vanes 32, the medial portions 54 are also at the same angle of inclination as the portions 48 and 50.

The vanes 32 thus have the same angle of inclination throughout their entire lateral width from the central post 34 to the housing 22.

Unlike the stationary vanes 32, the set of rotating vanes 30 are not connected to the housing. Thus, the vanes 30 are able to rotate relative to the housing 22 as well as relative to the axle (or central post) 34. The vanes 32 are securely connected to a collar 56 which is cylindrical and laterally encircles the axle 34. The vanes 32 have medial portions 58 which are connected to the collar 56 at connection points 60 which are at an angle of inclination of six degrees with respect to the axis 23. Since the vanes 30 are preferably rigid, the vanes 30 extend outwardly from the axle 34 at the same angle of inclination throughout their entire lateral width. The collar 56 is rotatably mounted on the axle 34. The bearing 36 is preferably mounted within the collar 56 and positioned between the collar 56 and the axle 34. The vanes are preferably integral with the collar 56. Alternatively, however, the vanes 30 may also be welded to the collar 56.

Figure 8A:
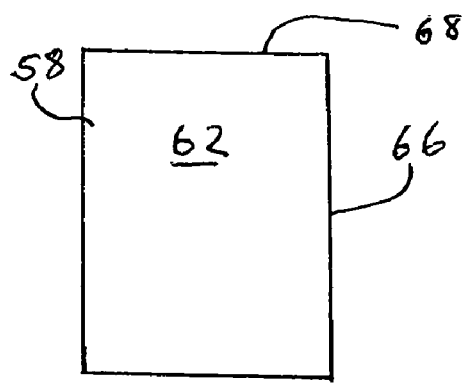
FIG. 8A is a front plan view of a representative vane of the rotatable vane component structure of the present invention.
Figure 8B:
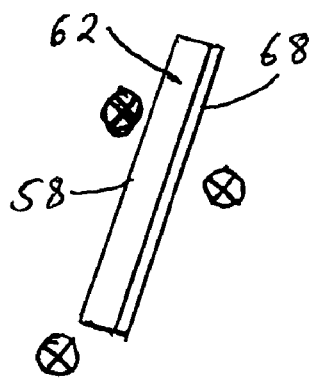
FIG. 8B is a top view of a representative vane of the rotatable vane component structure of the present invention as installed in the housing.
Figure 8C:
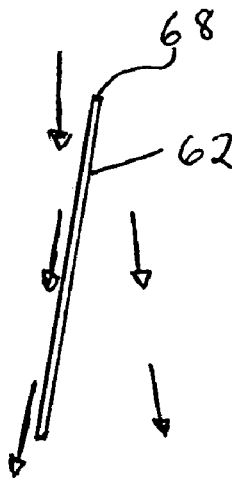
FIG. 8C is a side end view of a representative vane of the rotatable vane component structure of the invention as installed in the housing.
Figure 9A:
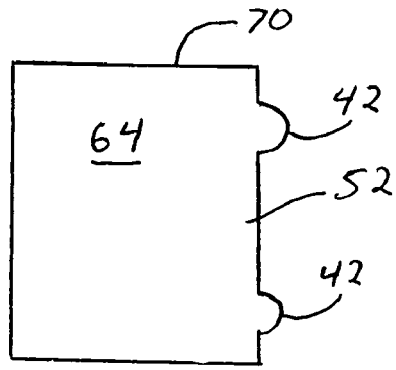
FIG. 9A is a front plan view of a representative vane of the stationary vane component structure of the present invention.
Figure 9B:
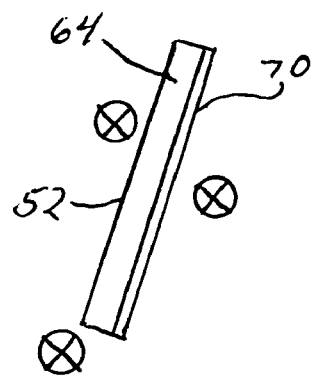
FIG. 9B is a top view of a representative vane of the stationary vane component structure of the present invention as installed in the housing.
Figure 9C:
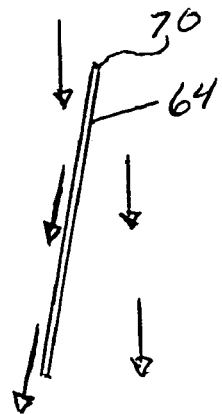
FIG. 9C is a side end view of a representative vane of the stationary vane component structure of the invention as installed in the housing.

The set of vanes 30 preferably include six individual vanes 62, while the set of vanes 32 preferably include four individual vanes 64. The vanes 62 and 64 are preferably planar and generally rectangular in shape, as shown in FIG. 8. The vanes 64 extend radially across the width of the housing 22 from one side of the housing to the central post 34. The vanes 64 are thus stationary relative to the housing 22 and the central post 34. The vanes 62 extend radially across the width of the housing from the axle 34 and collar 56 to the housing 22. But, they do not contact the housing 22. Vanes 62 instead have lateral end portions 66 which are instead proximal to and adjacent the housing 22. This enables the vanes 62 to rotate relative to the housing 22.

The leading edges 68 of vanes 62 extend in a straight line radially across the housing 22 from the central post 34 to the housing 22. Similarly the leading edges 70 of vanes 64 extend in a straight line radially across the housing 22 from the axle (or central post) 34 to the housing 22.

The apertures 46 (and the straight aperture wall portions 52) and connection points 60 are preferably inclined at opposite directions at opposite sides of the housing 22. The apertures 46 (and wall portions 52) are thus inclined in a clockwise direction with respect to the housing 22. Concomitantly, the connection points 60 are thus inclined in a clockwise direction with respect to the housing 22. Thus, the vanes 62 and the vanes 64 are oriented at an angle which is laterally clockwise from a vantage point of the fluid stream 28 entering the housing 22.

The housing 22 is also provided with upper curved tabs 72 and upper straight tabs 74 at the upper end wall portions (or longitudinally upper end portions) 76 of the housing 22 and lower straight tabs 78 and lower curved tabs 80 at the lower end wall portions (or longitudinally lower end portions) 82 of the housing 22. The tabs 72, 74, 78 and 80 extend radially outwardly from the wall portions 76 and 80 of the housing 22. The upper straight tabs 74 preferably include upper main portions 84 and upper peripheral portions 86 oriented so that the upper peripheral portions 86 extend outwardly from the housing 22 and perpendicular to the housing 22. The upper main portions 84 are inclined at an obtuse angle relative to the upper wall portions 76 and extend away from the lower wall portions 82. The upper main portions 84 are flat and the upper peripheral portions 86 are also flat and inclined relative to the upper main portions 84. When suitably positioned in the intake duct 12, the upper peripheral portions 86 engage the rim 88 of the duct thereby preventing movement of the device 10 against the rim 88 in a longitudinal direction relative to the duct preventing the device from moving deeper into the duct than desired. The lower tabs 78 similarly have lower main portions 90 and lower peripheral portions 92 oriented so that the lower peripheral portions 92 extend outwardly from the housing 22 and perpendicular to the housing 22. The lower main portions 90 are inclined at an obtuse angle relative to the lower wall portions 82 and extend away from the upper wall portions 76. The lower main portions 90 are similarly flat and the lower peripheral portions 92 are also flat and inclined relative to the lower main portion 88. When suitably positioned in the intake duct 12, the lower peripheral portions 92 engage the inner surfaces 94 of the duct 12. The upper curved tabs 72 preferably include upper main portions 95 and upper peripheral portions 96 so that the upper peripheral portions 96 are parallel to the upper wall portions 76 and extend toward the lower wall portions 82. The upper main portions 95 are inclined at an obtuse angle relative to the walls 76 and extend away from the lower wall portions 82. The upper main portions 95 are curved and the upper peripheral portions 96 are also curved and inclined relative to the upper main portions 95. When suitably positioned in the intake duct 12, the upper peripheral portions 96 engage the rim 88 of the duct thereby preventing movement of the device 10 against the rim in a longitudinal direction relative to the duct preventing the device from moving deeper into the duct than desired. The lower curved tabs 80 similarly have lower main portions 97 and lower peripheral portions 98 so that the lower peripheral portions 98 are parallel to the lower wall portions 82 and extend toward the upper wall portions 76. The lower main portions 97 are similarly curved and the lower peripheral portions 98 are also curved and inclined relative to the lower main portion 97. The lower main portions 97 are inclined at an acute angle relative to the lower wall portions 82 and extend away from the upper walls 76. The curved tabs 72 and 80 are preferably a hyberbolic shape in cross-section. When suitably positioned in the intake duct 12, the lower peripheral portions 98 engage the inner surfaces 94 of the duct. The relatively small end portion 99 of the lower peripheral portion 98 tends to produce a gripping effect effectively holding the device in the desired position within the duct 12. The tabs 72, 74, 78 and 80 are composed of spring steel or other suitable substance which has memory such that it resists movement from its position in which extending outwardly from the upper and lower wall portions 76 and 82. Thus, when the diametrical dimensions of the housing 22 relative to the duct 12 produce a narrow gap therebetween and therefor therefore result in inward deflection of the tabs 78 and 80 when the device is installed in the duct 12, the resistive force of the tabs 78 and 80 serve to resist movement of the device 10 relative to the duct 12. This tends to retain the device 10 within the duct 12. The upper main portions 84 and 95 and upper peripheral portions 86 and 96 as well as the lower main portions 90 and 97 and lower peripheral portions 92 and 98 are planar but may be other suitable shapes rather than curved or flat.

The device 10 is used in an intake duct 12 to provide swirl to the fluid flow exiting the device but may also be used in an intake manifold or runner to swirl the fluid flow which includes both air and fuel. However, when used in a tailpipe, exhaust pipe or other portion of the exhaust system, the device 10 also provides swirl of the fluid flow exiting the device but the ultimate purpose of this application is not to provide mixing of the fluid components but simply to improve exhaust gas flow. Basically, the device 10 functions to draw out exhaust gases from the exhaust system. The improved exhaust gas flow in effect scavenges the exhaust gases from the exhaust ports resulting in improved intake fluid flow through the engine providing increased power.

In operation, the set of vanes (or set of rotatable vanes) 30 work in conjunction with the set of vanes (or set of stationary vanes) 32 to accomplish the desired objective of swirling the intake or exhaust fluid flow 28 passing through the passageway 12, passageway (tailpipe) 19 or passageway 18. Initially, the intake or exhaust fluid stream 28 meets the set of rotatable vanes 30 which alter the direction of the fluid flow 28 from a generally straight and longitudinal direction to a more lateral direction. This is accomplished smoothly and gradually as a result of the ability of the vanes 62 to spin responsive to the force of the moving fluid stream 28. After passing through the set of rotatable vanes 30, the fluid stream 28 meets the set of stationary vanes 32. Subsequently, the set of stationary vanes 32 deflects the fluid stream 28 laterally. Since the fluid stream 28 is moving in a lateral direction (to a degree) when it meets the set of stationary vanes 32, it is more easily diverted to a more lateral direction of motion than would otherwise be produced by a more conventional prior art vane structure. As a result of the combination of rotatable vanes and stationary vanes, the device of the present invention facilitates generation of swirl of the fluid stream. Moreover, the generation of swirl by the device is accomplished with less absorption of energy of the fluid stream so that intake and exhaust system efficiency is not compromised as with conventional prior art systems and devices.

Accordingly, there has been provided, in accordance with the invention, a device for swirling the fluid flow passing through the passageway of an intake or exhaust system of an internal combustion engine that fully satisfies the objectives set forth above. It is to be understood that all terms used herein are descriptive rather than limiting. Although the invention has been described in conjunction with the specific embodiment set forth above, many alternative embodiments, modifications and variations will be apparent to those skilled in the art in light of the disclosure set forth herein. Accordingly, it is intended to include all such alternatives, embodiments, modifications and variations that fall within the spirit and scope of the invention set forth in the claims hereinbelow.

What is claimed is:

1. A fluid swirling device for insertion in an intake system of an internal combustion engine, comprising:
a housing open at both longitudinal ends thereof;
an axle mounted within said housing;
a set of rotatable vanes rotatably mounted on said axle and positioned in path of a fluid stream passing through said housing, each vane of said first set of vanes angled with respect to said axle so that intake fluid of the fluid stream impinging on said first set of vanes produces rotation of said first set of vanes relative to said axle and so that the intake fluid is deflected by said vane to impart a swirling motion to the fluid stream;
a set of stationary vanes rigidly mounted on said axle so that said set of stationary vanes is stationary relative to said housing and relative to said set of rotatable vanes, said set of stationary vanes positioned in path of the fluid stream passing through said housing, said set of rotatable vanes and said set of stationary vanes positioned to allow passage of the fluid stream through said both longitudinal ends.

2. The device of claim 1 further including a bearing interconnecting said axle and said set of rotatable vanes for minimizing frictional forces generated by rotation of said set of rotatable vanes relative to said axle.

3. The device of claim 1 wherein said set of stationary vanes is rigidly secured to said housing, each vane of said set of stationary vanes angled with respect to said axle in order to deflect the intake fluid impinging thereon to impart a swirling motion to the fluid stream.

4. The device of claim 3 wherein said set of stationary vanes includes a set of appendages at lateral edges thereof and wherein said housing has a set of apertures for receiving said set of appendages in order to secure said set of stationary vanes to said housing.

5. The device of claim 4 wherein said set of apertures include a set of pairs of apertures each pair of apertures oriented at an angle of inclination relative to direction of flow of fluid stream entering said housing.

6. The device of claim 3 wherein said stationary vanes are angled in solely an axial direction.

7. The device of claim 1 wherein said housing is cylindrical and entirely open at medial and peripheral areas of said both longitudinal ends thereof for allowing the fluid stream to pass longitudinally through entire length of said housing and circumferentially closed and wherein said set of stationary vanes extends from said axle to said housing.

8. The device of claim 1 wherein said housing includes an upper tab and a lower tab, said upper tab and said lower tab extending outwardly from said housing.

9. The device of claim 8 wherein said upper tab is curved and wherein said lower tab is curved.

10. The device of claim 8 wherein said upper tab is flat and wherein said lower tab is flat.

11. The device of claim 8 wherein said upper tabs and said lower tabs are composed of a material providing memory so that deflection from the angled orientation provides a resistive force to the deflection so that insertion of said housing in an engine duct enables retention therein by means of the resistive force exerted upon inner walls of the duct and by means of the resistive force exerted upon edge of the duct.

12. The device of claim 8 wherein said upper tab is located at an upper wall of said housing and wherein said lower tab is located at a lower wall of said housing.

13. The device of claim 12 wherein said upper tab includes an upper main portion and an upper peripheral portion and wherein said lower tab includes a lower main portion and a lower peripheral portion, said lower main portion angled outwardly from said lower wall and said upper main portion angled outwardly from said upper wall and said lower peripheral portion extending toward said upper wall and said upper peripheral portion extending toward said lower wall.

14. The device of claim 1 wherein said axle includes a front portion which is curved to minimize obstruction of the fluid stream, said front portion parabolic in longitudinal section.

15. A fluid swirling device for insertion in an exhaust system of an internal combustion engine, comprising:
a housing open at both longitudinal ends thereof;
an axle mounted within said housing;
a set of rotatable vanes rotatably mounted on said axle and positioned in path of a fluid stream passing through said housing, each vane of said set of rotatable vanes angled with respect to said axle so that exhaust fluid of the fluid stream impinging on said set of rotatable vanes produces rotation of said set of rotatable vanes relative to said axle and so that the intake fluid is deflected by said set of rotatable vanes to impart a swirling motion to the fluid stream;

a set of stationary vanes rigidly mounted on said axle so that said set of stationary vanes is stationary relative to said housing and relative to said set of rotatable vanes, said set of stationary vanes positioned in path of the fluid stream passing through said housing, said set of rotatable vanes and said set of stationary vanes positioned to allow passage of the fluid stream through said both longitudinal ends.

16. The device of claim 15 further including a bearing interconnecting said axle and said set of rotatable vanes for minimizing frictional forces generated by rotation of said set of rotatable vanes relative to said axle.

17. The device of claim 16 wherein said stationary vanes are rigidly secured to said housing, each vane of said set of stationary vanes angled with respect to said axle in order to deflect the intake fluid impinging thereon to impart a swirling motion to the fluid stream.

18. The device of claim 17 wherein said axle includes a front portion which is curved to minimize obstruction of the fluid stream, said front portion parabolic in longitudinal section.

19. The device of claim 17 wherein said stationary vanes are angled in solely an axial direction.

20. The device of claim 16 wherein said set of stationary vanes have a set of appendages at lateral edges thereof and wherein said housing has a set of apertures for receiving said set of appendages in order to secure said set of stationary vanes to said housing.

21. The device of claim 20 wherein said set of apertures include a set of pairs of apertures each pair of apertures oriented at an angle of inclination relative to direction of flow of fluid stream entering said housing.

22. The device of claim 15 wherein said housing is cylindrical, entirely open at medial and peripheral areas of said both longitudinal ends thereof for allowing the fluid stream to pass longitudinally through entire length of said housing and circumferentially closed.

23. The device of claim 15 wherein said housing includes a wall having an upper tab and a lower tab, said upper tab extending outwardly from upper wall of said housing and said lower tab extending outwardly from lower wall of said housing.

24. The device of claim 23 wherein said upper tab is located at a longitudinally upper end portion of said housing and wherein said lower tab is located at a longitudinally lower end portion of said housing.

25. The device of claim 23 wherein said upper tab includes an upper main portion and an upper peripheral portion and wherein said lower tab includes a lower main portion and a lower peripheral portion, said lower main portion angled outwardly from said lower wall and said upper main portion angled outwardly from said upper wall and said lower peripheral portion extends toward said upper wall and said upper peripheral portion extends toward said lower wall.

26. The device of claim 23 wherein said upper tab is curved and wherein said lower tab is curved.

27. The device of claim 23 wherein said upper tabs and said lower tabs are composed of a material providing memory so that deflection from the angled orientation provides a resistive force to the deflection so that insertion of said housing in an engine duct enables retention therein by means of the resistive force exerted upon inner walls of the duct and by means of the resistive force exerted upon edge of the duct.

28. A fluid swirling device for insertion in an intake or exhaust system of an internal combustion engine, comprising:
　a housing;
　an axle mounted within said housing;
　a set of rotatable vanes rotatably mounted on said axle and positioned in path of a fluid stream passing through said housing, each vane of said set of rotatable vanes angled with respect to said axle so that exhaust fluid of the fluid stream impinging on said set of rotatable vanes produces rotation of said set of rotatable vanes relative to said axle and so that the intake fluid is deflected by said set of rotatable vanes to impart a swirling motion to the fluid stream;
　a set of stationary vanes rigidly mounted on said axle so that said set of stationary vanes is stationary relative to said housing and relative to said set of rotatable vanes, said set of stationary vanes positioned in path of the fluid stream passing through said housing, said set of rotatable vanes and said set of stationary vanes positioned to allow passage of the fluid stream through said both longitudinal ends, said set of stationary vanes angled solely in axial direction and in direction of the fluid stream entering said housing.

29. The device of claim 28 further including a bearing interconnecting said axle and said set of rotatable vanes for minimizing frictional forces generated by rotation of said set of rotatable vanes relative to said axle.

30. The device of claim 28 wherein said set of stationary vanes include a set of appendages at lateral edges thereof and wherein said housing has a set of apertures for receiving said set of appendages in order to secure said set of stationary vanes to said housing.

31. The device of claim 30 wherein said set of apertures include a set of pairs of apertures each pair of apertures oriented at an angle of inclination relative to direction of flow of fluid stream entering said housing.

32. The device of claim 28 wherein said housing is cylindrical, entirely open at longitudinal ends thereof and circumferentially closed.

33. The device of claim 28 wherein said housing includes a wall having an upper tab located at a longitudinally upper end portion of said housing and a lower tab located at a longitudinally lower end portion of said housing, said upper tab extending outwardly from upper wall of said housing and said lower tab extending outwardly from lower wall of said housing.

34. The device of claim 33 wherein said upper tab includes an upper main portion and an upper peripheral portion and wherein said lower tab includes a lower main portion and a lower peripheral portion, said lower main portion angled outwardly from said lower wall and said upper main portion angled outwardly from said upper wall and said lower peripheral portion extends toward said upper wall and said upper peripheral portion extends toward said lower wall.

35. The device of claim 33 wherein said upper tab is curved and wherein said lower tab is curved.

36. The device of claim 33 wherein said upper tabs and said lower tabs are composed of a material providing memory so that deflection from the angled orientation provides a resistive force to the deflection so that insertion of said housing in an engine duct enables retention therein by means of the resistive force exerted upon inner walls of the duct and by means of the resistive force exerted upon edge of the duct.

37. The device of claim 28 wherein said axle includes a front portion which is curved to minimize obstruction of the fluid stream, said front portion parabolic in longitudinal section.

38. A fluid swirling device for insertion in an intake or exhaust system of an internal combustion engine, comprising:
- a housing entirely circumferentially closed at both longitudinal end portions thereof;
- an axle mounted within said housing;
- a set of rotatable vanes rotatably mounted on said axle and positioned in path of a fluid stream passing through said housing, each vane of said set of rotatable vanes angled with respect to said axle so that exhaust fluid of the fluid stream impinging on said set of rotatable vanes produces rotation of said set of rotatable vanes relative to said axle and so that the intake fluid is deflected by said set of rotatable vanes to impart a swirling motion to the fluid stream;
- a set of stationary vanes rigidly mounted on said axle so that said set of stationary vanes is stationary relative to said housing and relative to said set of rotatable vanes, said set of stationary vanes positioned in path of the fluid stream passing through said housing, said set of rotatable vanes and said set of stationary vanes positioned to allow passage of the fluid stream through said both longitudinal ends, said set of stationary vanes angled in axial direction and in direction of the fluid stream entering said housing.

39. The device of claim 38 further including a bearing interconnecting said axle and said set of rotatable vanes for minimizing frictional forces generated by rotation of said set of rotatable vanes relative to said axle.

40. The device of claim 38 wherein said set of stationary vanes include a set of appendages at lateral edges thereof and wherein said housing has a set of apertures for receiving said set of appendages in order to secure said set of stationary vanes to said housing.

41. The device of claim 40 wherein said set of apertures include a set of pairs of apertures each pair of apertures oriented at an angle of inclination relative to direction of flow of fluid stream entering said housing.

42. The device of claim 38 wherein said housing is cylindrical and entirely open at longitudinal ends thereof.

43. The device of claim 38 wherein said housing includes a wall having an upper tab located at a longitudinally upper end portion of said housing and a lower tab located at a longitudinally lower end portion of said housing, said upper tab extending outwardly from upper wall of said housing and said lower tab extending outwardly from lower wall of said housing.

44. The device of claim 43 wherein said upper tab includes an upper main portion and an upper peripheral portion and wherein said lower tab includes a lower main portion and a lower peripheral portion, said lower main portion angled outwardly from said lower wall and said upper main portion angled outwardly from said upper wall and said lower peripheral portion extends toward said upper wall and said upper peripheral portion extends toward said lower wall.

45. The device of claim 43 wherein said upper tab is curved and wherein said lower tab is curved.

46. The device of claim 43 wherein said upper tabs and said lower tabs are composed of a material providing memory so that deflection from the angled orientation provides a resistive force to the deflection so that insertion of said housing in an engine duct enables retention therein by means of the resistive force exerted upon inner walls of the duct and by means of the resistive force exerted upon edge of the duct.

47. The device of claim 38 wherein said axle includes a front portion which is curved to minimize obstruction of the fluid stream, said front portion parabolic in longitudinal section.

* * * * *